(12) United States Patent
Stilianos et al.

(10) Patent No.: US 9,683,597 B2
(45) Date of Patent: Jun. 20, 2017

(54) COMPRESSION RESISTANT COMPONENT

(71) Applicant: Autoliv ASP, Inc., Ogden, UT (US)

(72) Inventors: Demetri Stilianos, Howell, MI (US);
Joshua Forwerck, Royal Oak, MI
(US); Mark Caron, Warren, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 60 days.

(21) Appl. No.: 14/694,373

(22) Filed: Apr. 23, 2015

(65) Prior Publication Data

US 2016/0312819 A1  Oct. 27, 2016

(51) Int. Cl.
F16B 43/02 (2006.01)
F16B 43/00 (2006.01)
F16B 5/02 (2006.01)

(52) U.S. Cl.
CPC ............... F16B 43/00 (2013.01); F16B 5/02 (2013.01)

(58) Field of Classification Search
CPC ......... F16B 5/0258; F16B 43/00; F16B 43/02
USPC .................................................. 411/546, 547
See application file for complete search history.

(56) References Cited

U.S. PATENT DOCUMENTS

| 846,440 | A | * | 3/1907 | Adams | F16B 43/00 384/275 |
| 4,113,398 | A | | 9/1978 | Jordan | |
| 4,231,279 | A | * | 11/1980 | Theriot | F16B 43/00 411/396 |
| 5,523,142 | A | * | 6/1996 | Bedoussac | B29C 37/0085 123/634 |
| 6,663,330 | B2 | | 12/2003 | Powell | |
| 7,699,571 | B2 | | 4/2010 | Booher et al. | |
| 8,215,885 | B2 | * | 7/2012 | Meisner | F16B 39/10 411/132 |
| 8,444,357 | B2 | * | 5/2013 | Clarke | F16B 39/24 411/132 |
| 2011/0072612 | A1 | * | 3/2011 | Boote | F04D 29/263 16/2.1 |

* cited by examiner

*Primary Examiner* — Roberta Delisle
(74) *Attorney, Agent, or Firm* — Brinks Gilson & Lione

(57) ABSTRACT

A compression resistant component adapted to be mounted to a surface using a mechanical fastener having a component body with a first surface and a second surface and a fastener passage defined by the component body extending from the first surface to the second surface. At least one elongated compression limiter is embedded in the component body displaced from and substantially parallel to a main longitudinal axis of the fastener passage. The elongated compression limiter if formed of a material having a greater compressive modulus that the material of which the component body is formed. When a fastener exerts a compressive force on the mounting component, the elongated compression limiter bears a portion of the compressive force exerted by the fastener on the component body, thereby allowing the component body to resist the effects of the compressive force.

15 Claims, 2 Drawing Sheets

COMPRESSION RESISTANT COMPONENT

TECHNICAL FIELD

The present invention pertains to a compression resistant component. In particular, the invention pertains to a component for mounting with an embedded compression limiter adapted to resist the effects of the compressive force exerted by a fastener when the component is mounted to a surface or object.

BACKGROUND

In many industrial applications, it is often desirable to mount a component made of a polymeric plastic material to another object or surface using a mechanical fastener. A common problem associated with such mounted components is that the components become compromised under the compressive load applied by the fastener. Under the compressive load of the fastener, the material of the mounting component can fail or begin to creep, thereby reducing the torque of the mechanical fastener over time.

Typically, screw machined, stamped, or cold formed metal compression limiters are used to reinforce the mounting component around a fastener bore or passageway, allowing it to withstand the compressive force of the mechanical fastener. However, these solutions have proven to be expensive, heavy, and limited in manufacturing and application flexibility. Solutions using a metal bushing to limit the compressive force applied to the plastic component tend to strip away from the rest of the mounting component, thereby allowing the mounting component to rotate about the fastener. In some applications loosening of the mounting component is a significant disadvantage since maintaining the orientation of the component may be critical to its operation. Moreover, mechanical failure of the component will often impair its function.

Accordingly, there is a need in the art for an improved compression resistant component adapted for mounting.

SUMMARY OF THE INVENTION

The present invention provides a compression resistant component adapted for mounting that addresses the above-noted problems of the related art.

The compression resistant component of the present invention includes a component body with a fastener passage extending through the component body and at least one elongated compression limiter embedded in the component body displaced from and parallel to a longitudinal axis of the fastener passage. The compression limiter is formed of a material having a greater compressive modulus than that of the component body.

The component body can be mounted to a surface or an object by passing a fastener through the fastener passage and securing the fastener to the desired surface or object. When the component is mounted, the fastener applies a compressive force on the mounted component and the elongated compression limiter bears a portion of the compressive force, thereby allowing the component to resist the effects of the compressive force.

The present invention provides manufacturing flexibility in that the elongated compression limiters can be insert molded into the component body or set in after the component body is molded. Additionally, the number of elongated compression limiters and the geometry and dimensions of the compression limiters can be varied to fit the requirements of the application in which the component is to be used.

Accordingly, the present invention provides an improved compression resistant mounting component with greater manufacturing and application flexibility while also reducing the material weight of the mounting component by up to 95% of existing solutions. This weight reduction being calculated by comparing an existing compression limiter made of steel and weighing 4.66 grams with three steel elongated compression limiters of the present invention measuring 1 mm×10.5 mm.

Further details and advantages will become apparent from the following description of the accompanying drawings that illustrate a compression resistant mounting component according to the invention. The drawings are provided for purely illustrative purposes and are not intended to limit the scope of the present invention

DETAILED DESCRIPTION OF THE DRAWINGS

Figure 1:
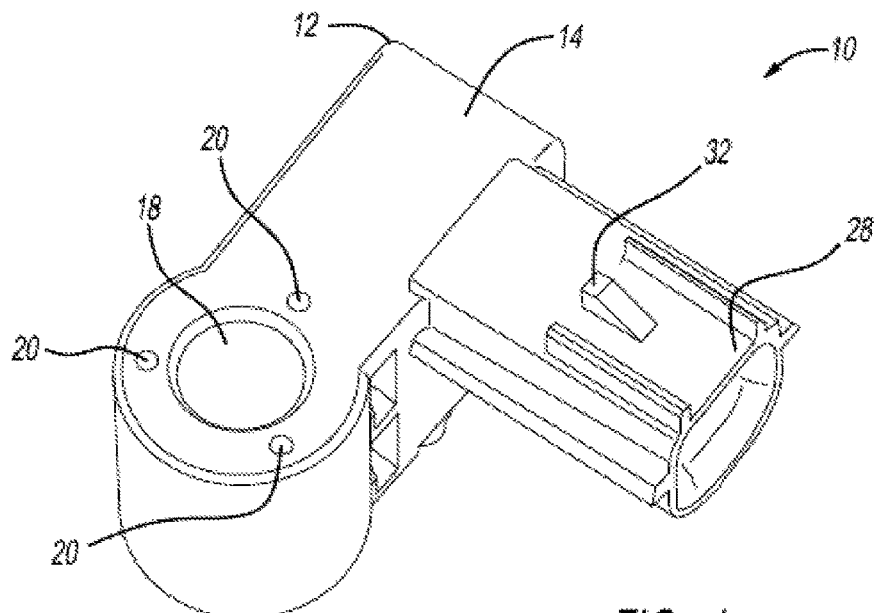
FIG. 1 shows a perspective view of a compression resistant mounting component according to a preferred embodiment of the present invention.
Figure 2:
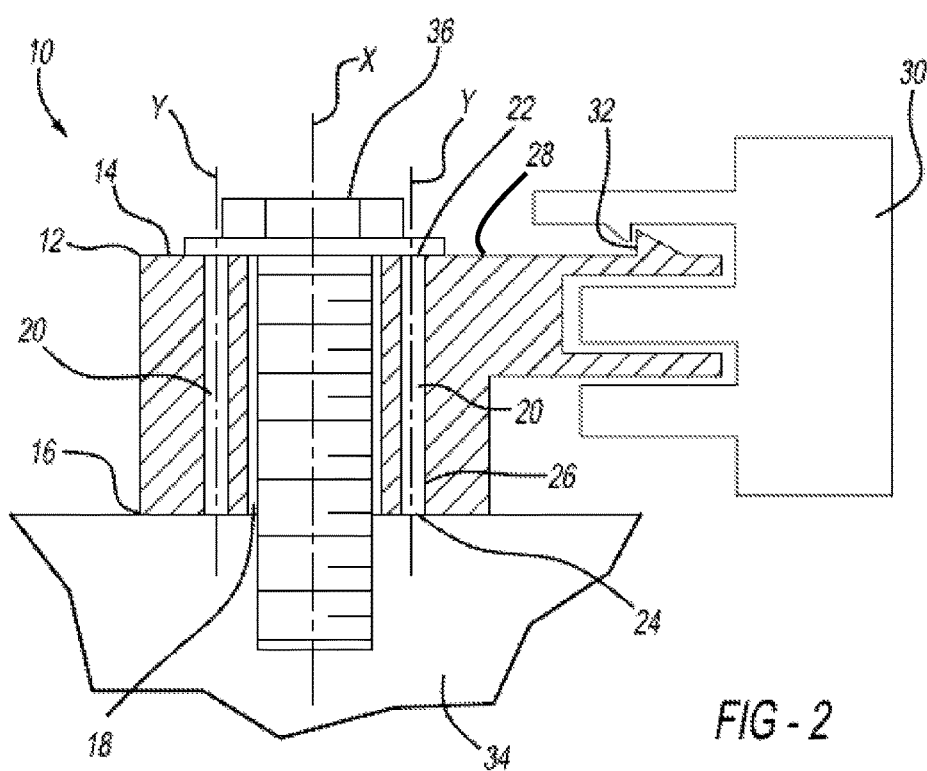
FIG. 2 shows a cross-sectional view of the compression resistant mounting component or FIG. 1 mounted to a surface and an exemplary attachment attached.

FIGS. 1 and 2 show a compression resistant component 10 according to one embodiment of the present invention. The illustrated compression resistant component 10 includes a component body 12 having a first surface 14 and a second surface 16 on opposite sides of the body. The first surface 14 of the component body 12 is substantially parallel to the second surface 16 of the component body 12. The component body 12 defines a fastener passage 18 having a main longitudinal axis X. The illustrated fastener passage 18 is generally cylindrical-shaped with a circular cross section but it is also noted that the fastener passage 18 can alternatively have any other suitable cross sectional shape. The fastener passage 18 extends from the first surface 14 of the component body 12 to the second surface 16 of the component body 12 so the fastener passage 18 extends entirely through the component body 12.

The illustrated compression resistant component 10 further includes a plurality of elongated compression limiters 20 embedded in the component body 12. Each elongated compression limiter 20 has a first end 22, a second end 24, an outer surface 26, and a longitudinal axis Y. The elongated compression limiters 20 are embedded in the component body 12 such that the longitudinal axis Y of the elongated compression limiters 20 is displaced form and substantially parallel to the main longitudinal axis X of the fastener passage 18. The first end 22 and second end 24 of the elongated compression limiter 20 are positioned adjacent to the first surface 14 and second surface 16 of the component body 12 respectively. The first end 22 and second end 24 of the elongated compression limiter 20 can be positioned within the component body 12, lie on a surface 14, 16 of the component body 12, protrude from the component body 12, or any combination thereof. The elongated compression limiters 20 surround the fastener passage 18 at a distance that allows the elongated compression limiters 20 to be covered by a washer or the head of a mechanical fastener when it is inserted into the fastener passage 18 and abuts the first surface 14 of the component body 12. The illustrated elongated compression limiters 20 are generally cylindrical with a circular cross section but it is noted that the elongated compression limiters 20 can alternatively have any other suitable cross sectional shape.

The component body 12 of the present invention is formed of a material having a low compressive modulus, such as a polymer including but not limited to plastic, rubber, or epoxy. The elongated compression limiters 20 are formed of a material having a compressive modulus higher than the compressive modulus of the material used to form the component body 12, including but not limited to metal (e.g. steel), ceramic, or polymer.

Figure 3A:
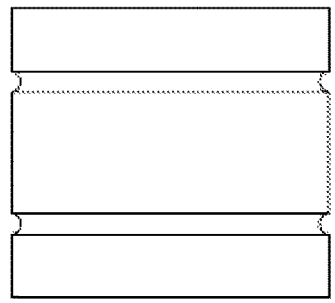
FIG. 3A illustrates a first surface finish that can be applied to an elongated compression limiter.
Figure 3B:
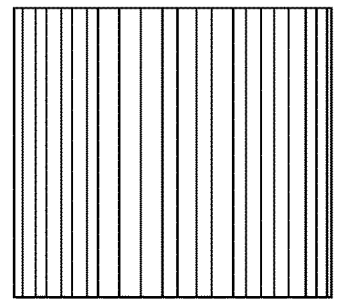
FIG. 3B illustrates a second surface finish that can be applied to an elongated compression limiter.
Figure 3C:
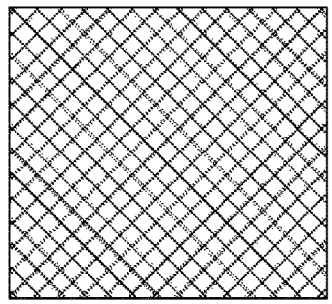
FIG. 3C illustrates a third surface finish that can be applied to an elongated compression limiter.
Figure 3D:
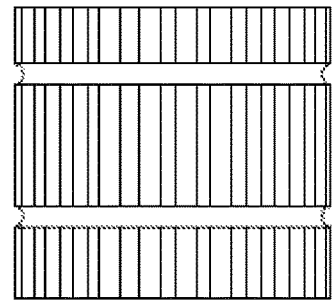
FIG. 3D illustrates a fourth surface finish that can be applied to an elongated compression limiter.

FIGS. 3A-3D show a number of surface finishes or knurls that may be applied to the outer surface 26 of an elongated compression limiter 20. FIG. 3A shows an annular surface finish. FIG. 3B shows a linear surface finish. FIG. 3C shows a diamond surface finish. FIG. 3D shows a combination annular and linear surface finish. These surface finishes add texture to the outer surface 26 of the elongated compression limiter 20 to increase retention of the elongated compression limiters 20 in the component body 12. The outer surface 26 of an elongated compression limiter 20 may be finished in various alternative finishes or combinations thereof. The outer surface 26 of the elongated compression limiter 20 may also or alternatively be plated.

The compression resistant component 10 illustrated in FIGS. 1 and 2 further includes a housing 28 integrally formed with and extending from the component body 12. FIG. 2 shows a schematic interpretation of a generic attachment 30 that may be attached to and secured by the housing 28. The attachment 30 can be a sensor or any alternate object depending on the application in which the compression resistant component 10 is to be used. The housing 28 may be sized to fit and secure an attachment 30. The housing 28 shown in FIGS. 1 and 2 includes a snap 32 integrally formed with the housing 28 for securing an attachment 30.

Referring again to FIG. 2, a cross-sectional view of a compression resistant component 10 is shown mounted to a surface or object 34. The surface or object 34 can vary depending on the application in which the compression resistant component 10 is being use. To mount the compression resistant component 10 to a surface or object 34 a fastener 36 is inserted into the fastener passage and secured to the surface or object 34. The fastener may be a screw, nail, rivet, bolt, or an alternative suitable fastener. Once the fastener 36 is secured to the surface or object 34, the head of the fastener 36 or a washer used in conjunction with the fastener 36 contacts the first surface 14 of the component body 12 and the first ends 22 of the elongated compression limiters 20. The fastener 36 applies a compressive force on the component body 12 along the main longitudinal axis X of the fastener passage. The elongated compression limiters 20 are compressively column loaded and bear at least a portion of the compressive force exerted by the fastener 36, thereby reducing the compressive force and strain experienced by the component body 12. As such, the compression resistant component 10 is able to resist the effects of the compressive force exerted by the fastener 36.

Figure 4:
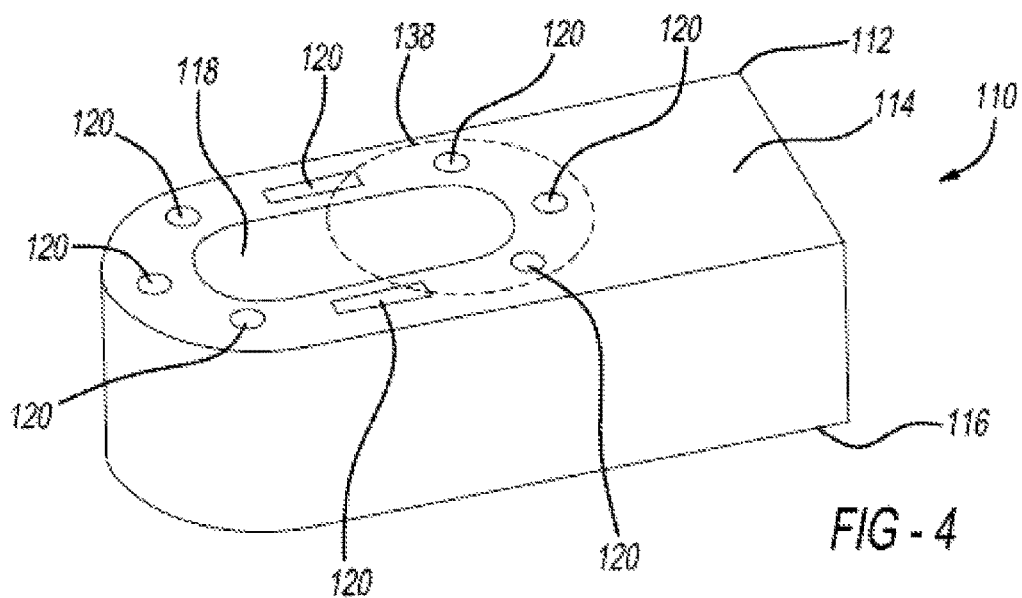
FIG. 4 shows a perspective view of a compression resistant mounting component according to an alternate embodiment of the present invention.

Referring now to FIG. 4 an alternate embodiment of the present invention is shown. The illustrated compression resistant component 110 includes a component body 112 having a first surface 114 and a second surface 116 on opposite sides of the body. The first surface 114 of the component body 112 is substantially parallel to the second surface 116 of the component body 112. The component body 112 defines a fastener passage 118. The fastener passage 118 extends from the first surface 114 of the component body 112 to the second surface 116 of the component body 112 so the fastener passage 118 extends entirely through the component body 112. The illustrated fastener passage 118 has a generally oval-shaped cross-section but it is also noted that the fastener passage 118 can alternatively have any other suitable cross-section geometry including, but not limited to a circle, square, rectangle, or triangle. FIG. 4 illustrates that a compression resistant component 110 of the present invention can use any number of elongated compression limiters 120 ranging from one to as many as needed to provide compression resistance to the component body 112. The diameter of the elongated compression limiters 120 can vary based on the requirements of the application. The cross sectional geometry of the elongated compression limiters 120 can also vary based on the requirements of the application. The elongated compression limiters 120 may be can be a pin, a bar, or a plate which can be solid or hollow, or any combination thereof. Additionally, the dotted circle 138 shown in FIG. 4 represents the head of a fastener or a washer used in conjunction with a fastener that contacts the first surface 114 of the component body 112 when the fastener is inserted into the fastener passage 118. When the cross-sectional geometry of the fastener passage 118 is an elongated shape such as the oval shown in FIG. 4 or a rectangle, the fastener is able to be moved within the fastener passage 118 before being secured into position, thereby making the position of the compression resistant component 110 adjustable and reducing the need for exacting precision in manufacturing and installation of the compression resistant component 110.

The illustrated compression resistant component 10, 110 shown in FIGS. 1, 2 and 4 are formed by injection molding the component body 12, 112. The elongated compression limiters 20, 120 can be insert molded to the component body 12, 112 or installed after the component body 12, 112 is molded. The elongated compression limiters 20, 120 may be sized before being embedded in the component body 12, 112 or the elongated compression limiters 12, 112 can be machined down to the desired size after the compression resistant component 10, 110 has been formed.

While the above description constitutes preferred embodiments of the present invention, it will be appreciated that the invention is susceptible to modification, variation, and change without departing from the proper scope and fair meaning of the accompanying claims.

What is claimed is:
1. A compression resistant mounting component adapted to be mounted to a surface using a mechanical fastener comprising:
   a component body having a first surface and a second surface generally parallel to the first surface, wherein the component body defines a fastener passage extending from the first surface to the second surface, and wherein the fastener passage has a main longitudinal axis and is configured to receive the fastener;

at least one elongated compression limiter being one of a pin, a bar, or a plate, having a first end, a second end, an outer surface, and a longitudinal axis, wherein the elongated compression limiter is embedded in the component body such that the longitudinal axis of the elongated compression limiter is displaced from and substantially parallel to the main longitudinal axis of the fastener passage, the first end and the second end of the elongated compression limiter are adjacent to the first surface and the second surface of the component body respectively, and the elongated compression limiter bears a portion of a compressive force exerted by the fastener on the component body; and wherein the component body is of a material having a first compressive modulus and the elongated compression limiter is of a material having a second compressive modulus greater than the first compressive modulus.

2. The component of claim 1, wherein the component body is formed of a polymer material.

3. The component of claim 1, wherein the elongated compression limiter is a hollow tube.

4. The component of claim 1, wherein the elongated compression limiter is formed of a metal material.

5. The component of claim 1, wherein the elongated compression limiter is formed of a ceramic material.

6. The component of claim 1, wherein the elongated compression limiter is formed of a polymer material.

7. The component of claim 1, wherein the first end of the elongated compression limiter lies on the first surface of the component body and wherein the second end of the elongated compression limiter lies on the second surface of the component body.

8. The component of claim 1, wherein the first end of the elongated compression limiter protrudes beyond the first surface of the component body and wherein the second end of the elongated compression limiter protrudes beyond the second surface of the component body.

9. The component of claim 1, wherein the outer surface of the elongated compression limiter is plated.

10. The component of claim 1, wherein the outer surface of the elongated compression limiter is knurled to enhance the mechanical connection between the elongated compression limiter and the component body material.

11. The component of claim 1, wherein a plurality of elongated compression limiters having a first end, a second end, an outer surface, and a longitudinal axis, are embedded in the component body arranged about the fastener passage defined by the component body such that the longitudinal axes of the elongated compression limiters are displaced from and parallel to the main longitudinal axis of the fastener passage and the elongated compression limiters bear a portion of the clamping force exerted by the fastener on the component body.

12. The component of claim 1, wherein the component body includes a housing configured to receive an attachment.

13. The component of claim 12, wherein the attachment is retained in the housing by a snap integrated into the housing.

14. The component of claim 1, wherein the fastener passage has an elongate horizontal cross-sectional shape to allow the component to be positionally adjustable relative to the fastener.

15. A compression resistant mounting component adapted to be mounted to a surface using a mechanical fastener comprising:

a component body having a first surface and a second surface generally parallel to the first surface, wherein the component body defines a fastener passage extending from the first surface to the second surface, and wherein the fastener passage has a main longitudinal axis and is configured to receive the fastener;

at least one elongated compression limiter having a first end, a second end, an outer surface, and a longitudinal axis, wherein the elongated compression limiter is embedded in the component body such that the longitudinal axis of the elongated compression limiter is displaced from and substantially parallel to the main longitudinal axis of the fastener passage, the first end and the second end of the elongated compression limiter are adjacent to the first surface and the second surface of the component body respectively, and the elongated compression limiter bears a portion of a compressive force exerted by the fastener on the component body;

wherein the component body is of a material having a first compressive modulus and the elongated compression limiter is of a material having a second compressive modulus greater than the first compressive modulus, and wherein the at least one elongated compression limiter is a plurality of elongated compression limiters which surround the fastener passage at a distance that allows the elongated compression limiters to be covered by the fastener when the fastener is inserted into the fastener passage.

* * * * *